(12) United States Patent
Rieschick et al.

(10) Patent No.: US 8,036,636 B1
(45) Date of Patent: Oct. 11, 2011

(54) ACCESS GATEWAY RECORD SUPPRESSION

(75) Inventors: Gary Joel Rieschick, Louisburg, KS (US); Kent DeLancy Mabee, Leawood, KS (US); Troy Alexander Wilson, Lenexa, KS (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 710 days.

(21) Appl. No.: 12/109,537

(22) Filed: Apr. 25, 2008

(51) Int. Cl.
*H04M 11/00* (2006.01)
(52) U.S. Cl. .................... 455/406; 379/114.12; 709/217
(58) Field of Classification Search .................. 455/405, 455/406
See application file for complete search history.

(56) References Cited

U.S. PATENT DOCUMENTS

| | | | |
|---|---|---|---|
| 6,415,024 B1 | 7/2002 | Dunn et al. | |
| 2002/0136376 A1* | 9/2002 | Fleischer et al. | 379/114.12 |
| 2010/0332615 A1* | 12/2010 | Short et al. | 709/217 |

* cited by examiner

*Primary Examiner* — Dwayne Bost
*Assistant Examiner* — Joseph Dean, Jr.

(57) ABSTRACT

A method of operating a communication system is disclosed. An access gateway sends an authentication request to an authentication server. The access gateway receives an authentication response from the authentication server that includes a suppress record attribute. In response to the suppress record attribute, the access gateway disables an accounting record function. A communication system is disclosed. An access gateway sends an authentication request to an authentication server. The authentication server provides an authentication response that includes a suppress record attribute. The access gateway disables an accounting record function in response to the suppress record attribute.

8 Claims, 5 Drawing Sheets

ACCESS GATEWAY RECORD SUPPRESSION

TECHNICAL BACKGROUND

Telecommunication companies are generally commercial entities. As such, telecommunication companies track each subscriber's activities on their network so that subscribers are charged appropriately. For voice telephone calls, the telecommunication company may create call detail records (CDRs) to assist in tracking a subscriber's local, long distance, or roaming usage. Likewise, for data services, a telecommunication company may create usage detail records (UDRs) to assist in tracking a subscriber's data usage.

In the wireless communication industry, exciting new technologies and services are being deployed. For example, high performance or next generation push-to-talk services allow mobile telephones to connect to each other in less than one second. This sub-second connection time gives mobile phones a user experience that is similar to a "walkie-talkie." Mobile web browsing, image and video transmission, and mobile email are other examples of recent technologies and services communication companies may offer. Because many users are willing to pay a premium for these services, communication companies create billing records for these services to assist in charging subscribers.

Overview

A method of operating a communication system is disclosed. An access gateway sends an authentication request to an authentication server. The access gateway receives an authentication response from the authentication server that includes a suppress record attribute. In response to the suppress record attribute, the access gateway disables an accounting record function.

A communication system is disclosed. An access gateway sends an authentication request to an authentication server. The authentication server provides an authentication response that includes a suppress record attribute. The access gateway disables an accounting record function in response to the suppress record attribute.

DETAILED DESCRIPTION

Figure 1:
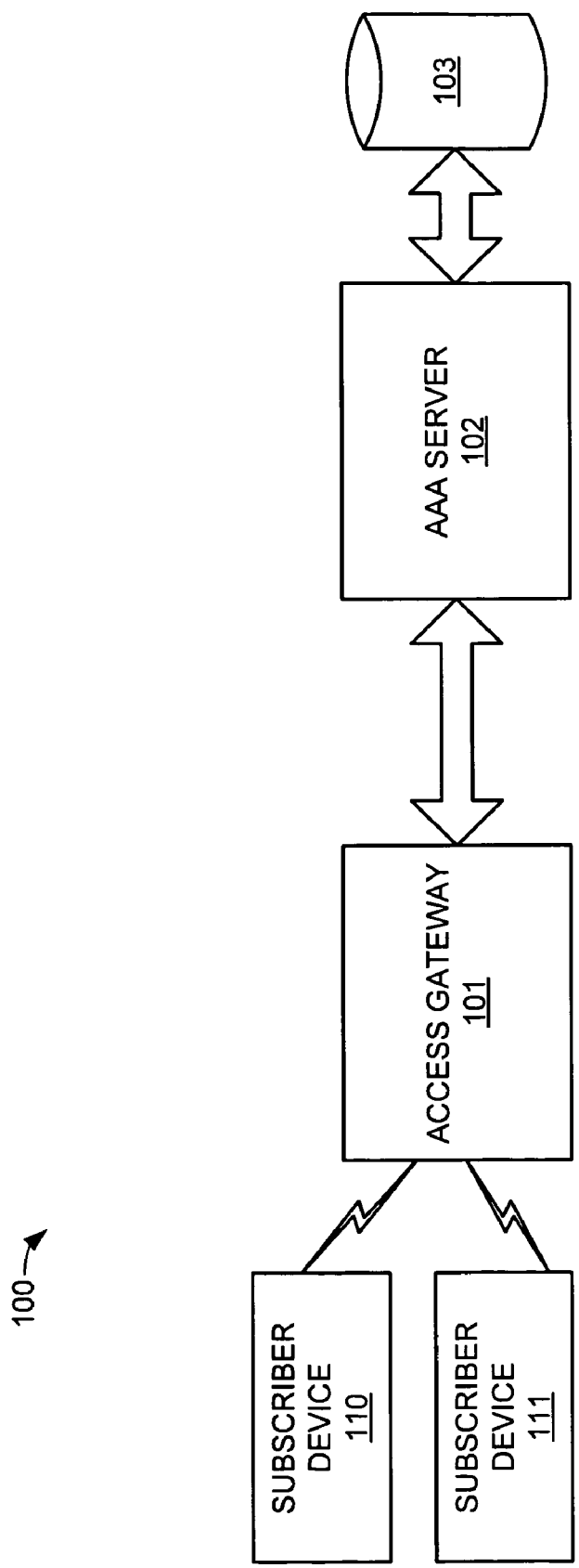
FIG. 1 is a block diagram illustrating a communication system that suppresses access gateway record generation.

FIG. 1 is a block diagram illustrating a communication system that suppresses access gateway record generation. Communication system 100 comprises: subscriber device 110, subscriber device 111; access gateway 101; authentication, authorization, and accounting (AAA) server 102; and plan database 103.

Subscriber devices 110 and 111 may be operatively coupled to access gateway 101. Access gateway 101 is operatively coupled to AAA server 102. AAA server 102 is operatively coupled to plan database 103.

Subscriber devices 110 or 111 may be any device, system, combination of devices, or other such communication platform capable of communicating with access gateway 101. Subscriber devices 110 and 111 may be, for example, an expanded function telephone, a mobile phone, a wireless phone, a wireless modem, a personal digital assistant (PDA), a computer system with a sound input, output, and an internet connection, a computer with public switched telephone network (PSTN) connection and a modem, a computer with a network card, an access terminal, a voice over internet protocol (VoIP) phone, a voice over packet (VOP) phone, or a soft phone, as well as other types of devices or systems that can exchange audio or data with access gateway 101. Other types of communication platforms are possible.

Access gateway 101 may comprise a computer, a network, or a collection of computers and networks that couple, link, or otherwise operatively provide subscriber devices 110 or 111 with communication service. It should be understood that access gateway 101 may comprise secondary data networks. For example, access gateway 101 may include a backhaul network, a local network, a long distance network, a packet network, or any combination thereof, as well as other types of networks. Access gateway 101 may be or include an access service network (ASN), an access service network gateway (ASN-GW), wireless local access network access gateway (WAG), packet data gateway (PDG), mobile switching center (MSC) and packet data serving node (PDSN).

Access gateway 101 may also include one or more base stations. A base station may be any wireless system that provides the air interface to subscriber devices 110 and 111 and communication connectivity to access gateway 101. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Subscriber devices 110 and 111 may establish communication sessions with access gateway 101 in order to receive communication services. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, subscriber device 110 or 111 may send a service session request to access gateway 101. To determine if subscriber device 110 or 111 is authorized to receive the requested service, access gateway 110 may send an authentication request to AAA server 102. In response to the authentication request, AAA server 102 may query plan database 103.

AAA server 102 may also query other databases. For example AAA server 102 may query a database containing information about subscriber device 110 or 111 to determine if subscriber device 110 or 111 is capable of, or authorized to, receive the requested service.

Plan database 103 may respond to a query from AAA server 102 with information about the billing plan associated with subscriber device 110 or 111. For example, plan database 103 may respond with information that indicates subscriber device 110 is associated with a flat rate type plan. A flat rate type plan (also known as a monthly recurring charge plan) is a billing plan whereby a subscriber is charged the same amount for predetermined services each billing cycle regardless of the actual usage of those services. AAA server 102 receives the response to its query for the information about the billing plan associated with subscriber device 110 or 111.

AAA server 102 determines a suppress record attribute based on the requested service and the information received about the billing plan associated with subscriber device 110 or 111. For example, AAA server 102 may receive information about the billing plan associated with subscriber device 110 that indicates subscriber device 110 is on a flat rate type plan for the requested service. In this case, AAA server 102 would set a suppress record attribute to be true. In other words, AAA server 102 would set the suppress record attribute to a state that will cause access gateway 101 to refrain from generating and sending accounting records detailing subscriber device 110's use of the requested service.

In another example, AAA server 102 may receive information about the billing plan associated with subscriber device 111 that indicates subscriber device 111 is on a metered billing plan for the requested service. In this case, AAA server 102 would set a suppress record attribute to be false. In other words, AAA server 102 would set the suppress record attribute to a state that will cause access gateway 101 to generate and send accounting records that detail subscriber device 111's use of the requested service.

AAA server 102 sends an authentication response to access gateway 101 that includes a suppress record attribute. Access gateway 101 receives the authentication response. In response to the received suppress record attribute, access gateway 101 may disable an accounting record function. Examples of accounting record functions that may be disabled are the generation of accounting records and the sending of accounting records. Other accounting record functions may be disabled.

In an embodiment, in response to the received suppress record attribute, access gateway 101 may refrain from the generation of accounting records for the requested service. In another embodiment, access gateway 101 may generate accounting records for the requested service. However, access gateway 101 may refrain from sending the accounting records to an accounting system such as AAA server 102.

It should be understood from the foregoing that by suppressing the generating or sending of accounting records for those subscribers and/or services that are on flat rate type plans, fewer accounting records will need to be stored and/or processed. This can result in substantial savings to a communication company or network operator. For example, if 80% of a company's subscribers are on a flat rate type plan for a particular service, then roughly an 80% reduction in the accounting records that need to be stored and processed may be realized. This may result in a substantial savings to the company.

Figure 2:
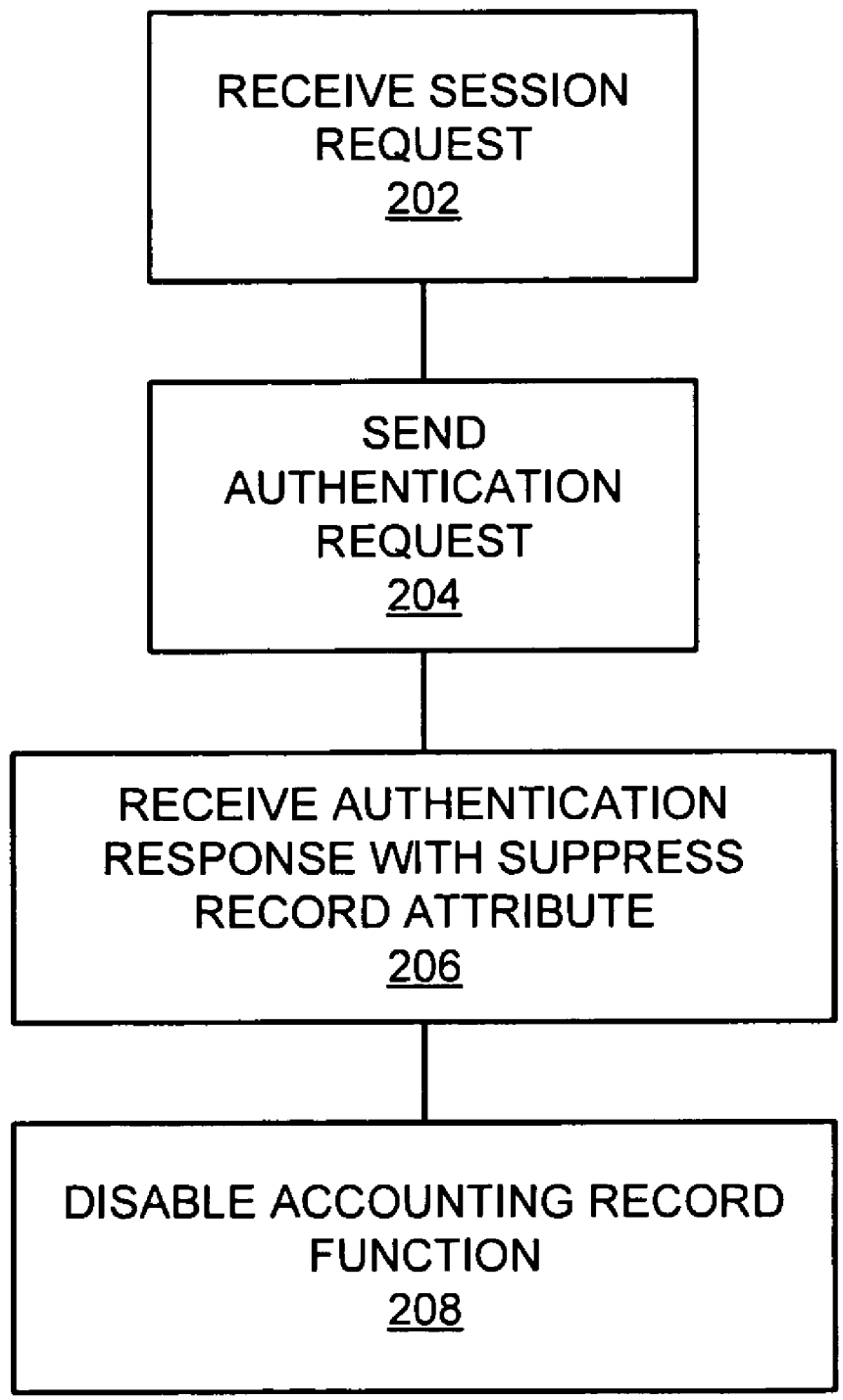
FIG. 2 is a flowchart illustrating a method of suppressing the record generation of an access gateway.

FIG. 2 is a flowchart illustrating a method of suppressing the record generation of an access gateway. The method illustrated in FIG. 2 may be performed by communication system 100. A session request is received (202). For example, subscriber device 110 may request a communication service by sending a service session request to access gateway 101. Access gateway 101 would receive this service session request.

An authentication request is sent (204). For example, in response to the service session request received in step 202, access gateway 101 may send an authentication request to AAA server 102. An authentication response with a suppress record attribute is received (206). For example, access gateway 101 may receive an authentication response from AAA server 102 that includes a suppress record attribute.

An accounting record function is disabled (208). For example, in response to the authentication response with a suppress record attribute, access gateway 101 may disable the generation of accounting records for the requested session. In another example, an access gateway may still generate accounting records. However, the access gateway may disable the sending of accounting records to an accounting system. In addition, other accounting record functions may be disabled.

Figure 3:
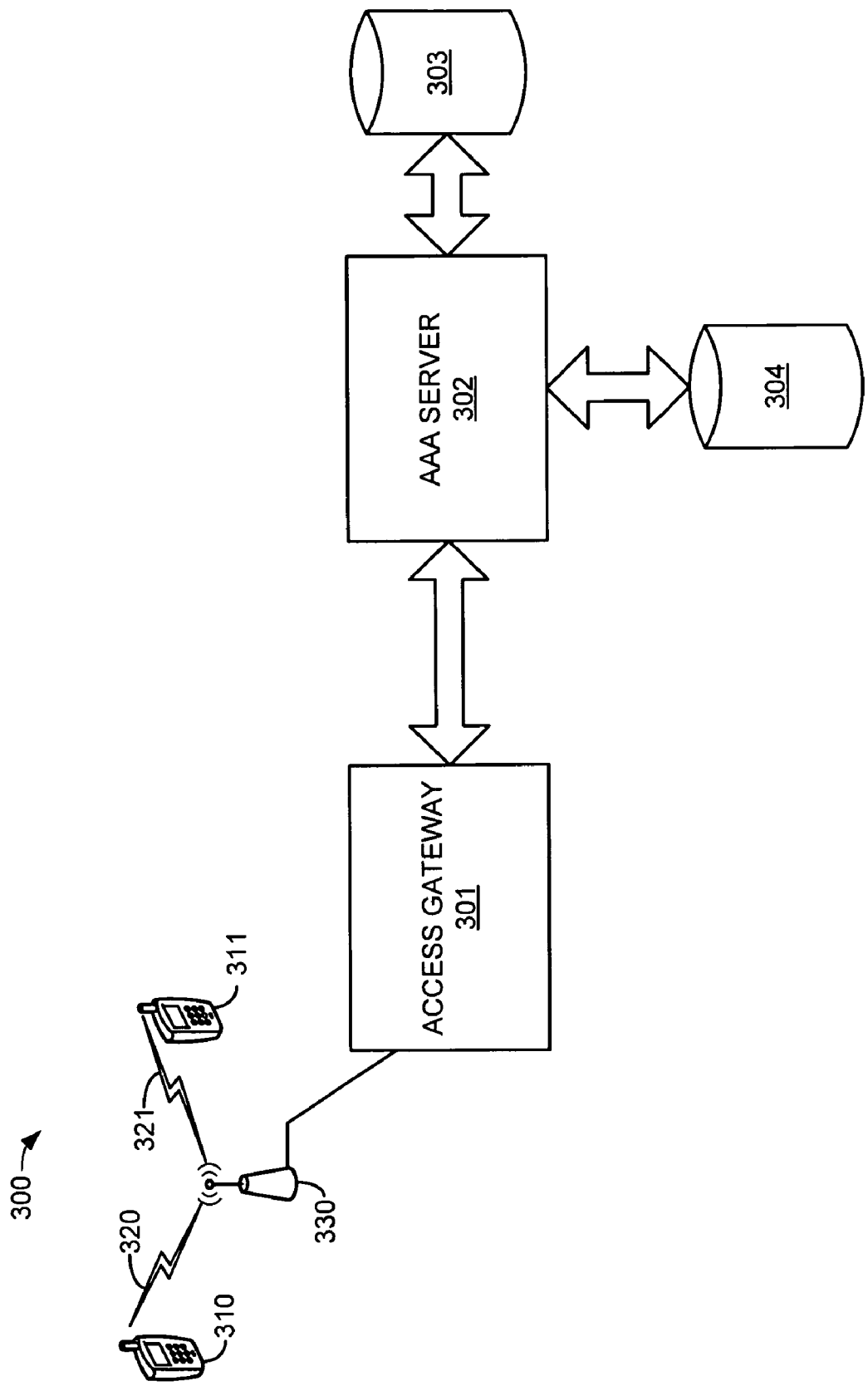
FIG. 3 is a block diagram illustrating a communication system that suppresses access gateway record generation.

FIG. 3 is a block diagram illustrating a communication system that suppresses access gateway record generation. Communication system 300 comprises: wireless device 310; wireless device 311; wireless link 320; wireless link 321; base station 330; access gateway 301; authentication, authorization, and accounting (AAA) server 302; plan database 303; and, accounting database 304.

Wireless devices 310 and 311 may be operatively coupled to base station 330 via wireless links 320 and 321, respectively. Base station 330 is operatively coupled to access gateway 301. Thus, wireless devices 310 and 311 may be operatively coupled to access gateway 301 via wireless links 320 and 321, respectively, and base station 330. Access gateway 301 is operatively coupled to AAA server 302. AAA server 302 is operatively coupled to plan database 303. AAA server 302 is operatively coupled to accounting database 304.

Wireless devices 310 or 311 may be any device, system, combination of devices, or other such communication platform capable of wireless communication with access gateway 301 via base station 330. Wireless devices 310 and 311 may be, for example, a mobile phone, a cell phone, a wireless phone, a wireless modem, or a personal digital assistant (PDA). Other types of communication platforms are possible.

Access gateway 301 may comprise a computer, a network or collection of computers and networks that couple, link, or otherwise operatively provide wireless devices 310 or 311 with communication service. It should be understood that access gateway 301 may comprise secondary data networks. For example, access gateway may include a backhaul network, a local network, a long distance network, a packet network, or any combination thereof, as well as other types of networks.

Access gateway 301 provides communication connectivity and acts as an aggregator of traffic or interworking device between base stations 330, other base stations, and a service provider network. Examples of access gateway 301 may include an access service network (ASN), an access service network gateway (ASN-GW), wireless local access network access gateway (WAG), packet data gateway (PDG), mobile switching center (MSC) and packet data serving node (PDSN).

Base station 330 may be any wireless system that provides the air interface to the wireless devices 310 and 311 and communication connectivity to access gateway 301. Examples of base stations that may be utilized include, base transceiver stations (BTSs), radio base stations (RBSs), Node B, enhanced Node B (eNBs) and others. Base station 330 may include a number of elements known to those skilled in the art comprising a transceiver, power amplifier, combiner, duplexer, antenna and control function.

Wireless devices 310 and 311 may establish communication sessions with access gateway 301 in order to receive communication services. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, wireless device 310 or 311 may send a service session request to access gateway 301. To determine if wireless device 310 or 311 is authorized to receive the requested service, access gateway 310 may send an authentication request to AAA server 302. In response to the authentication request, AAA server 302 may query plan database 303.

AAA server 302 may also query other databases. For example AAA server 302 may query a database containing information about wireless device 310 or 311 to determine if wireless device 310 or 311 is capable of, or authorized to, receive the requested service.

Plan database 303 may respond to a query from AAA server 302 with information about the billing plan associated with wireless device 310 or 311. For example, plan database 303 may respond with information that indicates wireless device 310 is associated with a flat rate type plan. A flat rate type plan (also known as a monthly recurring charge plan) is a billing plan whereby a subscriber is charged the same amount for predetermined services each billing cycle regardless of the actual usage of those services. AAA server 302 receives the response to its query for the information about the billing plan associated with wireless device 310 or 311.

AAA server 302 determines a suppress record attribute based on the requested service and the information received about the billing plan associated with wireless device 310 or 311. For example, AAA server 302 may receive information about the billing plan associated with wireless device 310 that indicates wireless device 310 is on a flat rate type plan for the requested service. In this case, AAA server 302 would set a suppress record attribute to be true. In other words, AAA server 302 would set the suppress record attribute to a state that will cause access gateway 301 to refrain from generating and sending accounting records detailing wireless device 310's use of the requested service.

In another example, AAA server 302 may receive information about the billing plan associated with wireless device 311 that indicates wireless device 311 is on a metered billing plan for the requested service. In this case, AAA server 302 would set a suppress record attribute to be false. In other words, AAA server 302 would set the suppress record attribute to a state that will cause access gateway 301 to generate and send accounting records that detail wireless device 311's use of the requested service.

AAA server 302 sends an authentication response to access gateway 301 that includes a suppress record attribute. Access gateway 301 receives the authentication response. In response to the received suppress record attribute, access gateway 301 may disable an accounting record function. Examples of accounting record functions that may be disabled are the generation of accounting records and the sending of accounting records. Other accounting record functions may be disabled.

In an embodiment, in response to the received suppress record attribute, access gateway 301 may refrain from the generation of accounting records for the requested service. In another embodiment, access gateway 301 may generate accounting records for the requested service. However, access gateway 301 may refrain from sending the accounting records to an accounting system such as AAA server 302.

The received suppress record attribute may indicate that accounting records are not to be suppressed. In this case, access gateway 301 would generate accounting records and send them to AAA server 302. AAA server 302 may send the accounting records to accounting database 304. Examples of accounting records are call detail records (CDRs) and usage detail records (UDRs).

For example, the billing plan associated with wireless device 311 may be a metered plan. The billing plan associated with wireless device 310 may be a flat rate type plan. In this case, access gateway 301 would generate and send accounting records associated with wireless device 311's use of metered services to AAA server 302. AAA server 302 would send these records (or a portion of the information therein) to accounting database 304. Access gateway 301 would not send accounting records associated with wireless device 310's use of flat rate services to AAA server 302.

Thus, it should be understood from the foregoing that by suppressing the generating or sending of accounting records to AAA server 302 for wireless device 310, fewer accounting records will need to be stored in accounting database 304. In addition, fewer accounting records will need to be processed by AAA server 302. Fewer accounting records will need to be processed by a billing system. It is also possible that less paper will be consumed sending detailed usage records to subscribers on flat rate type plans.

Figure 4:
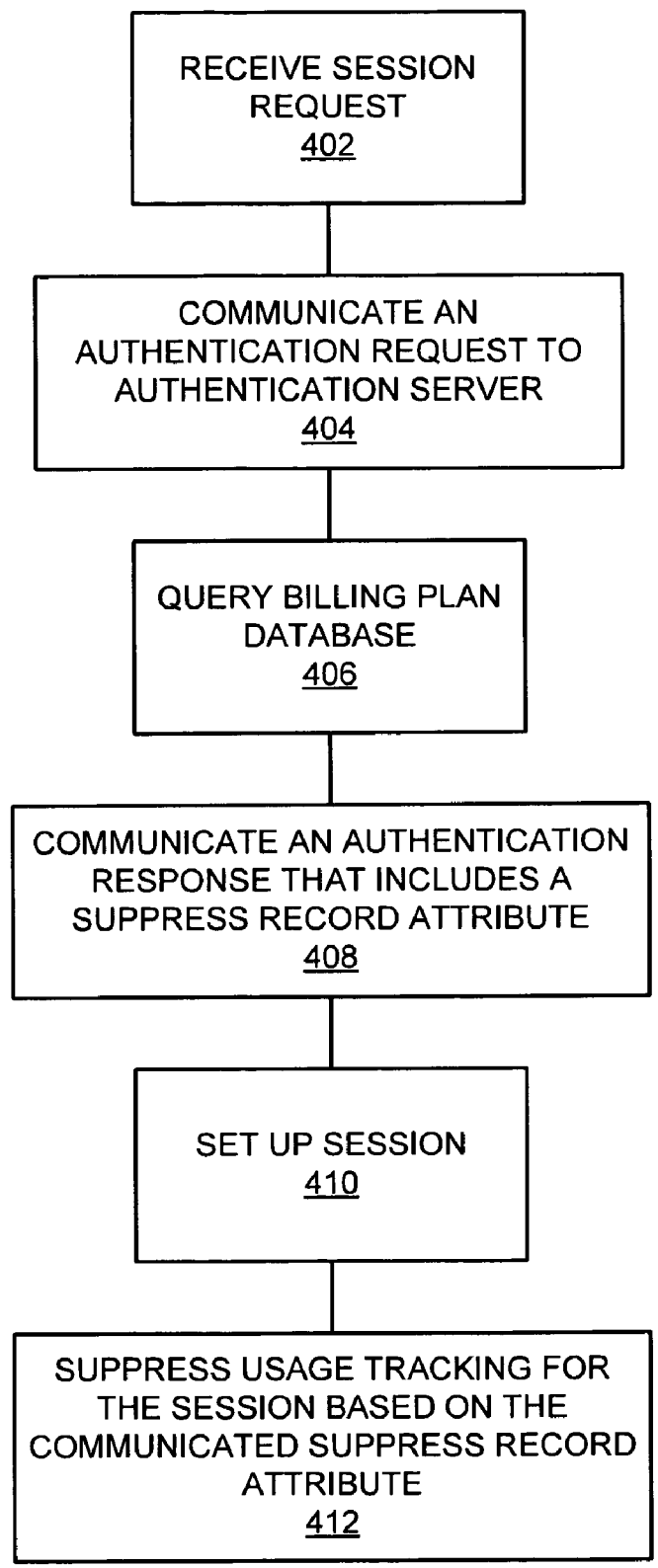
FIG. 4 is a flowchart illustrating a method of suppressing the record generation of an access gateway.

FIG. 4 is a flowchart illustrating a method of suppressing the record generation of an access gateway. The method illustrated in FIG. 4 may be performed by communication system 100 or communication system 300. A session request is received (402). For example, wireless device 310 may request a communication service by sending a service session request to access gateway 301 via communication link 320 and base station 330. Access gateway 301 receives this service session request.

An authentication request is communicated to an authentication server (404). For example, in response to the service session request received in step 402, access gateway 301 may communicate an authentication request to AAA server 302.

A billing plan database is queried (406). For example, AAA server 302 may query plan database 303 to obtain the type of billing plan that is associated with wireless device 310.

An authentication response that includes a suppress record attribute is communicated (408). For example, AAA server 302 may communicate an authentication response to access gateway 301. This authentication response may include an attribute or field that indicates whether access gateway 301 should refrain from at least one accounting function.

A session is set up (410). For example, a session to provide wireless device 310 with a service may be set up. This service may include telephone service, long distance service, mobile voice service, mobile data service, push-to-talk service, internet service, web browsing, email, pictures, picture messaging, video, video messaging, audio, voicemail, music, MP3's, new ring tone, stock ticker, news alerts, and so on.

Based on the communicated suppress record attribute, usage tracking for the session set up in step 410 is suppressed (412). For example, in response to the authentication response from AAA server 302, access gateway 301 may refrain from generating accounting records for the session. In another example, the access gateway may still generate accounting records. However, the access gateway may refrain from sending the accounting records to an accounting system. In addition, access gateway may refrain from performing other accounting record functions.

The methods, systems, networks, gateways, servers, subscriber devices, wireless devices, databases, and base stations described above may be implemented with, contain, or be executed by one or more computer systems. The methods described above may also be stored on a computer readable medium. Many of the elements of communication network 100 and communication network 300 may be, comprise, or include computers systems. This includes, but is not limited to: communication systems 100 and 300; subscriber device 110; subscriber device 111; access gateway 101; AAA server 102; plan database 103; wireless device 310; wireless device 311; base station 330; access gateway 301; AAA server 302; plan database 303; and, accounting database 304.

Figure 5:
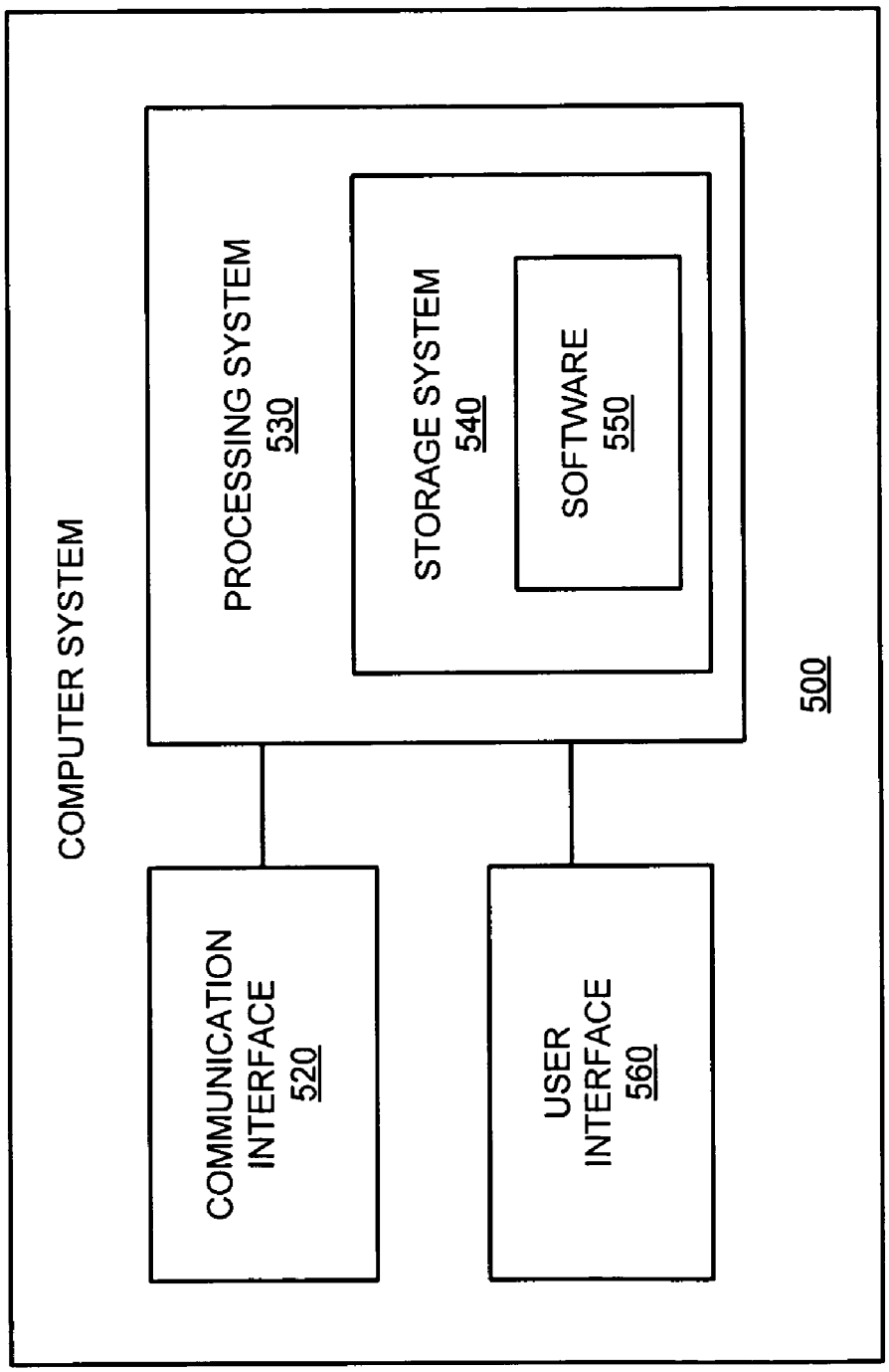
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, the method comprising:
   in a wireless communication device, generating and transmitting a request for service;
   in a base station, receiving the request for service transferred by the wireless communication device and responsively transferring the request for service for delivery to a wireless access gateway;
   in the wireless access gateway, receiving the request for service and responsively transferring an authentication request that identifies the wireless communication device and the request for service;
   in an authentication server, receiving the authentication request, querying a database for a billing plan, generating an authentication response that includes a suppress record attribute, setting the suppress record attribute based on the billing plan, and transferring the authentication response;
   in the wireless access gateway, receiving the authentication response responsive to the authentication request and suppressing generation of an accounting record based on the suppress record attribute.

2. The method of claim 1 wherein the suppress record attribute is set to suppress generation of the accounting record if the billing plan is a flat rate type plan.

3. The method of claim 1 wherein the authentication response identifies whether the wireless communication device is capable of receiving the requested service.

4. The method of claim 1, wherein the authentication request is sent to the authentication server during a session set up process.

5. A communication system, comprising:
   a wireless communication device configured to generate and transmit a request for service;
   a base station configured to receive the request for service transmitted by the wireless communication device and responsively transfer the request for service for delivery to a wireless access gateway;
   the wireless access gateway configured to receive the request for service and responsively transfer an authentication request that identifies the wireless communication device and the request for service;
   an authentication server configured to receive the authentication request, query a database for a billing plan, generate an authentication response that includes a suppress record attribute, set the suppress record attribute based on the billing plan, and transfer the authentication response; and
   wherein the wireless access gateway receives the authentication response responsive to the authentication request and suppresses generation of an accounting record based on the suppress record attribute.

6. The communication system of claim 5 wherein the suppress record attribute is set to suppress generation of the accounting record if the billing plan is a flat rate type plan.

7. The communication system of claim 5 wherein the authentication response identifies whether the wireless communication device is capable of receiving the requested service.

8. The communication system of claim 5 wherein the authentication request is sent to the authentication server during a session set up process.

* * * * *